May 5, 1959
C. O. LARSON
2,885,234
TURNBUCKLE
Filed July 8, 1954
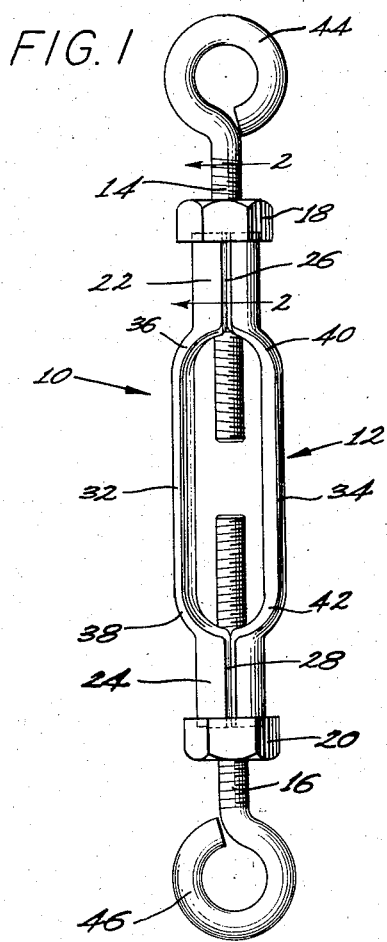
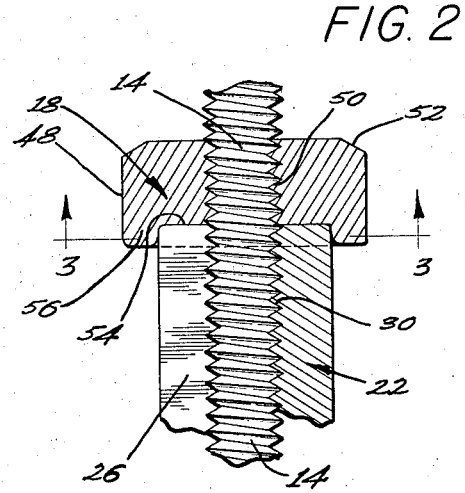
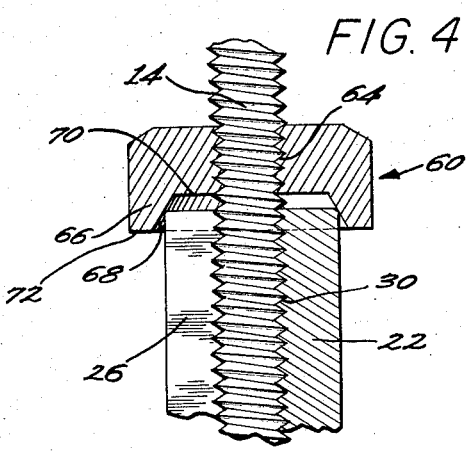
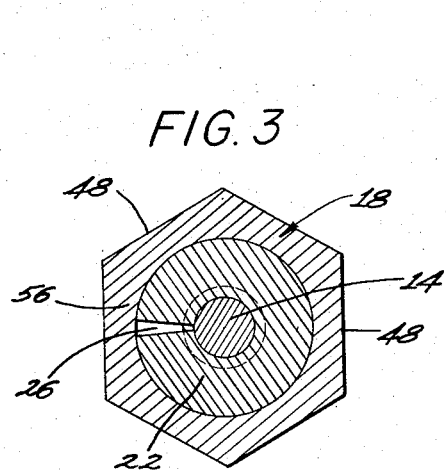
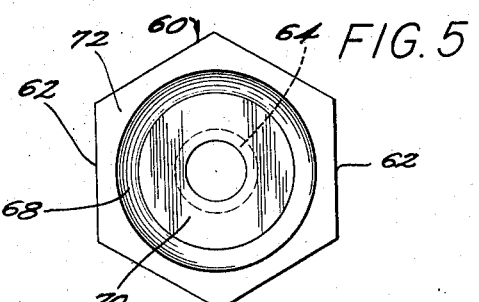
INVENTOR
CHARLES O. LARSON
BY Moore, Prangley & Clayton
ATTORNEYS United States Patent Office 2,885,234
Patented May 5, 1959

2,885,234
TURNBUCKLE

Charles O. Larson, Sterling, Ill.

Application July 8, 1954, Serial No. 442,158

3 Claims. (Cl. 287—60)

This invention relates to turnbuckles and more particularly to heavy duty sheet metal turnbuckles having locking and reinforcing nuts in combination therewith.

Sheet metal turnbuckles are coming into wider use due to their inherent low cost and ease of manufacture. One form of sheet metal turnbuckle includes a pair of cylindrical ends joined by two straps. Each end is formed from a substantially rectangular piece of sheet metal which is rolled into cylindrical form with two of the edges abutting to form a joint extending axially with respect to the finished turnbuckle. Each of the ends is threaded and receives a complementarily threaded shank. Each shank has on its outwardly extending end an eye or similar attachment member. When a force is applied to the turnbuckle by means of the eyes in a direction axially of the turnbuckle, the rolled ends of the turnbuckle tend to open. This tendency to open only becomes serious on heavy duty turnbuckles which are carrying an unusually large load. Sufficiently large loads can open the ends of the turnbuckle and thus render the turnbuckle inoperative for its intended purpose.

Even when moderate loads are applied to the turnbuckle assembly there is a tendency for the turnbuckle to rotate in an undesirable and unauthorized manner with respect to the threaded shanks, thus loosening the guy wire or other member attached to the eyes of the turnbuckle assembly.

Therefore it is an important object of this invention to provide an improved turnbuckle assembly of the type set forth and more specifically to provide in sheet metal turnbuckle assemblies means to prevent opening of the turnbuckle ends when unusually heavy loads are applied thereto.

Another object of the invention is to provide a lock nut on the threaded shanks cooperating with the turnbuckle, which lock nut prevents rotation of the shank with respect to the turnbuckle and also engages the associated turnbuckle ends to prevent opening thereof under heavy loads.

Still another object of the present invention is to provide in a turnbuckle assembly of the type set forth a locking member engaging the shanks of the turnbuckle assembly and urging the ends of the turnbuckle into close and binding engagement with the threads on the shanks.

These and other objects and advantages of the invention will be better understood from the following description when taken in conjunction with the accompanying drawing. In the drawing wherein like reference numerals have been utilized to designate like parts throughout:

Fig. 1 is an elevational view of a turnbuckle assembly including a sheet metal turnbuckle and a pair of locking nuts made in accordance with and embodying the principles of the present invention;

Fig. 2 is an enlarged partial view in section substantially as seen in the direction of the arrows along the line 2—2 of Fig. 1;

Fig. 3 is a view in cross section substantially as seen in the direction of the arrows along the line 3—3 of Fig. 2;

Fig. 4 is a view similar to Fig. 2 showing a modified form of locking nut made in accordance with and embodying the principles of the present invention; and Fig. 5 is an elevational view of the locking nut illustrated in Fig. 4.

Referring first to Fig. 1 there is shown a turnbuckle assembly generally designated by the numeral 10 made in accordance with and embodying the principles of the present invention. Turnbuckle assembly 10 includes a turnbuckle 12, a pair of threaded shanks 14 and 16 engaging the ends of the turnbuckle 12 and a pair of lock nuts 18 and 20 which threadedly engage the shanks 14 and 16, respectively.

Turnbuckle 12 is formed of sheet metal such as steel or brass and has a thickness of material relatively small compared with the size of the turnbuckle and the diameters of the threaded shanks 14 and 16. The material from which turnbuckle 12 is made is suitably shaped and formed to provide a pair of turnbuckle ends 22 and 24. Each of the ends 22 and 24 is formed from a substantially rectangular piece of metal which is rolled or otherwise formed into a substantially cylindrical shape having a pair of edges abutting to form a joint 26 and 28 on ends 22 and 24, respectively. Each of the joints 26 and 28 extends in a direction parallel to the longitudinal axis of turnbuckle 12.

As is best seen in Fig. 2, the inner surface of each of ends 22 and 24 is threaded as at 30 to receive the threaded shanks 14 and 16, respectively. A pair of straps 32 and 34 is formed integral with turnbuckle ends 22 and 24 and join the ends to form a complete turnbuckle. Each of the straps has a transverse dimension which is small compared to the diameter of ends 22 and 24 and is curved in a transverse direction to impart added strength thereto. Strap 32 is joined to turnbuckle end 22 by a curved portion 36 and is similarly joined to turnbuckle end 24 by a curved section 38. Strap 34 is similarly joined to end 22 by a curved section 40 and to turnbuckle end 24 by a curved section 42. It is to be understood that ordinarily ends 22 and 24 and straps 32 and 34 are formed from a single flat sheet of metal by suitable stamping, die cutting and die forming operations.

The threaded shanks 14 and 16 engage the threads in turnbuckle ends 22 and 24, respectively. Shank 14 has formed integral therewith an eye 44 for easy attachment to wires, cables, rope or other lines. Shank 16 is similarly provided with an integral eye 46. Some other type of attachment member such as a hook could be used instead of eyes 44 and 46.

Lock nuts 18 and 20 are identical in construction and, accordingly, only lock nut 18 will be described in detail. Lock nut 18 is preferably formed with a hexagonal configuration as is best seen in Fig. 3 providing tool engaging flats 48 which facilitate operation of the lock nut. An aperture is formed through lock nut 18 and is threaded as at 50 to engage threads on shank 14. The corners at one end of the lock nut are chamfered as at 52 to remove sharp corners. The other end of lock nut 18 has a countersunk cylindrical opening 54 formed therein and disposed coaxial with the aperture defined by threads 50. The opening 54 has a diameter substantially equal to or slightly greater than the external diameter of the associated turnbuckle end 22 and defines a flange 56 which surrounds and engages the outer circumference of turnbuckle end 22 on the wall portion thereof adjacent lock nut 18.

In use the lock nuts 18 and 20 are threaded on their associated shanks 14 and 16, respectively, until they abut the adjacent turnbuckle ends 22 and 24, respectively. When a force is applied through eyes 44 and 46 in a direction along the longitudinal axis of the turnbuckle assembly 10, the engagement of the threads 30 on the ends with the threads on the shanks 14 and 16 tends to open the turnbuckle ends 22 and 24. This opening movement of the turnbuckle ends 22 and 24 in effect causes the portions of the turnbuckle ends adjacent to the lock nuts to bear against flanges 56 on the lock nuts 18 and 20. This opening action of the turnbuckle ends therefore causes the turnbuckle ends to grasp the associated lock nut and thereby prevents turning of the lock nuts 18 and 20 with respect to their associated threaded shanks. Accordingly, lock nuts 18 and 20 are more firmly locked with respect to their associated threaded shanks.

The lock nuts 18 and 20 further positively prevent opening of the ends 22 and 24 to an extent to render the turnbuckle inoperative. More specifically, ends 22 and 24 never are permitted to open to an extent such that the threads 30 in the turnbuckle ends disengage the threads on the shanks 14 and 16. This is accomplished by the flange 56 on the lock nuts engaging the associated wall portions of the adjacent turnbuckle end 22 or 24. This can be best seen in Fig. 3 wherein it is demonstrated that a tight binding fit is provided between flange 56 and the associated turnbuckle end 22.

In Figs. 4 and 5 there is shown a second form of lock nut 60 made in accordance with and illustrating the principles of the present invention. Lock nut 60 is shown in engagement with threaded shank 14 and turnbuckle end 22 having threads 30 thereon and a joint 26. As is best seen in Fig. 5, lock nut 60 is formed with a hexagonal shape providing tool engaging flats 62. An aperture is formed in the center thereof and is threaded as at 64 to engage a complementarily threaded shank 14. One side of lock nut 60 has an aperture therein shaped like a truncated right cone having its axis aligned with the axis of threads 64. The aperture provides a flange 66 having an inner inclined wall 68 terminating in a flat surface 70. Wall 68 extends from flat surface 70 to the outer side 72 of lock nut 60.

The diameter of the flat surface 70 and the diameter of the aperture in surface 72 are so chosen that the diameter of the associated turnbuckle end 22 is intermediate these two diameters on lock nut 60. As a consequence when lock nut 60 is tightened upon shank 14 toward turnbuckle end 22, the outermost end of turnbuckle end 22 engages the sloping wall 68 substantially midway along the surface thereof. This construction permits the turnbuckle end 22 to be driven into very firm engagement with threaded shank 14 when lock nut 60 is turned toward turnbuckle end 22.

Any force applied along the longitudinal axis of the turnbuckle assembly incorporating lock nut 60 will tend to open or spread end 22 at the joint 26. Such action in effect enlarges the diameter of turnbuckle end 22 thus pressing against the lock nut 60 and locking nut 60 against rotation with respect to the threaded shank 14.

In addition the presence of the sloping wall 68 on flange 66 of lock nut 60 positively limits the amount of opening that turnbuckle end 22 can experience and in any event positively prevents turnbuckle end 22 from opening to an extent that the threads 30 thereof disengage the threads on shank 14.

It will be seen that there has been provided a turnbuckle assembly including lock nuts which positively prevent opening of sheet metal turnbuckle ends and which positively lock the various threaded parts with respect to each other. The construction of the lock nuts further increases the locking action when axial forces are applied to the turnbuckle assembly. Accordingly, the disclosed turnbuckle assembly including the lock nuts fulfills all of the objects and advantages set forth above.

Although two preferred embodiments of the invention have been shown for purposes of illustration, it is to be understood that various changes and modifications can be made therein without departing from the spirit and scope of the invention. Accordingly, the invention is to be limited only as set forth in the following claims.

I claim:

1. A heavy duty turnbuckle assembly comprising a sheet metal turnbuckle having a substantially cylindrical end provided with a slot extending the length thereof parallel to the axis of the end, said turnbuckle end being threaded, a threaded shank engaging and cooperating with said turnbuckle end and having an attachment portion formed on one end thereof, and a lock nut threadedly engaging said threaded shank, a flange formed on the side of said lock nut positioned toward said turnbuckle end and having an internal diameter slightly greater than the external diameter of said turnbuckle end to overlie and surround said turnbuckle end whereby to prevent opening of said turnbuckle end when a force is applied in an axial direction to said shank, said lock nut also locking said shank against turning with respect to said turnbuckle end when an axial force is applied to said shank.

2. A heavy duty turnbuckle assembly comprising a sheet metal turnbuckle having a pair of spaced apart cylindrical ends interconnected by a pair of integral straps, each turnbuckle end being formed of sheet metal material cylindrical in form with edges of the material parallel to the axis of said turnbuckle ends meeting to form the turnbuckle ends, each of said turnbuckle ends being threaded, a threaded shank engaged in each of said turnbuckle ends, an attachment portion formed on the outer ends of each of said shanks, and a lock nut threadedly engaged on each of said shanks, the face of each of said nuts adjacent the associated turnbuckle end having a cylindrical recess therein slightly greater in diameter than the associated turnbuckle end and forming a flange on the lock nut surrounding the associated turnbuckle end, said lock nuts positively preventing opening of said turnbuckle ends when forces are applied in opposite directions to said portions and said lock nuts locking said shanks and said turnbuckle against relative rotation when forces are applied in opposite directions to said attachment portions.

3. A heavy duty turnbuckle assembly comprising a sheet metal turnbuckle having a pair of spaced apart cylindrical ends interconnected by a pair of integral straps, each turnbuckle end being formed of sheet metal material cylindrical in form with edges of the material parallel to the axis of said turnbuckle ends meeting to form the turnbuckle ends, each of said turnbuckle ends being threaded, a threaded shank engaged in each of said turnbuckle ends, an attachment portion formed on the outer ends of each of said shanks, and a lock nut threadedly engaged on each of said shanks, each of said lock nuts having a recess formed therein on the face thereof adjacent the associated turnbuckle end, said recess being shaped as a truncated right cone, the largest diameter of said recess being larger than the diameter of the associated turnbuckle end and the smallest diameter of said recess being smaller than the diameter of the associated turnbuckle end so that the turnbuckle end engages the sloping wall defining said recess, said lock nuts positively preventing opening of the associated turnbuckle end and preventing relative rotation between the associated shank and turnbuckle end when forces are applied to said attachment portions in opposite directions.

References Cited in the file of this patent

UNITED STATES PATENTS

| 390,992 | Stillman | Oct. 9, 1888 |
| 598,307 | Leffler | Feb. 1, 1898 |
| 770,637 | Griffin | Sept. 20, 1904 |

FOREIGN PATENTS

| 14,924 | Great Britain | July 9, 1892 |
| 109,349 | Switzerland | May 16, 1925 |
| 122,974 | Great Britain | Feb. 16, 1919 |
| 421,989 | France | Jan. 7, 1911 |
| 431,828 | France | Sept. 21, 1911 |